No. 703,833. Patented July 1, 1902.
D. ROJAT.
FILTERING APPARATUS.
(Application filed July 24, 1901.)
(No Model.) 2 Sheets—Sheet 2.
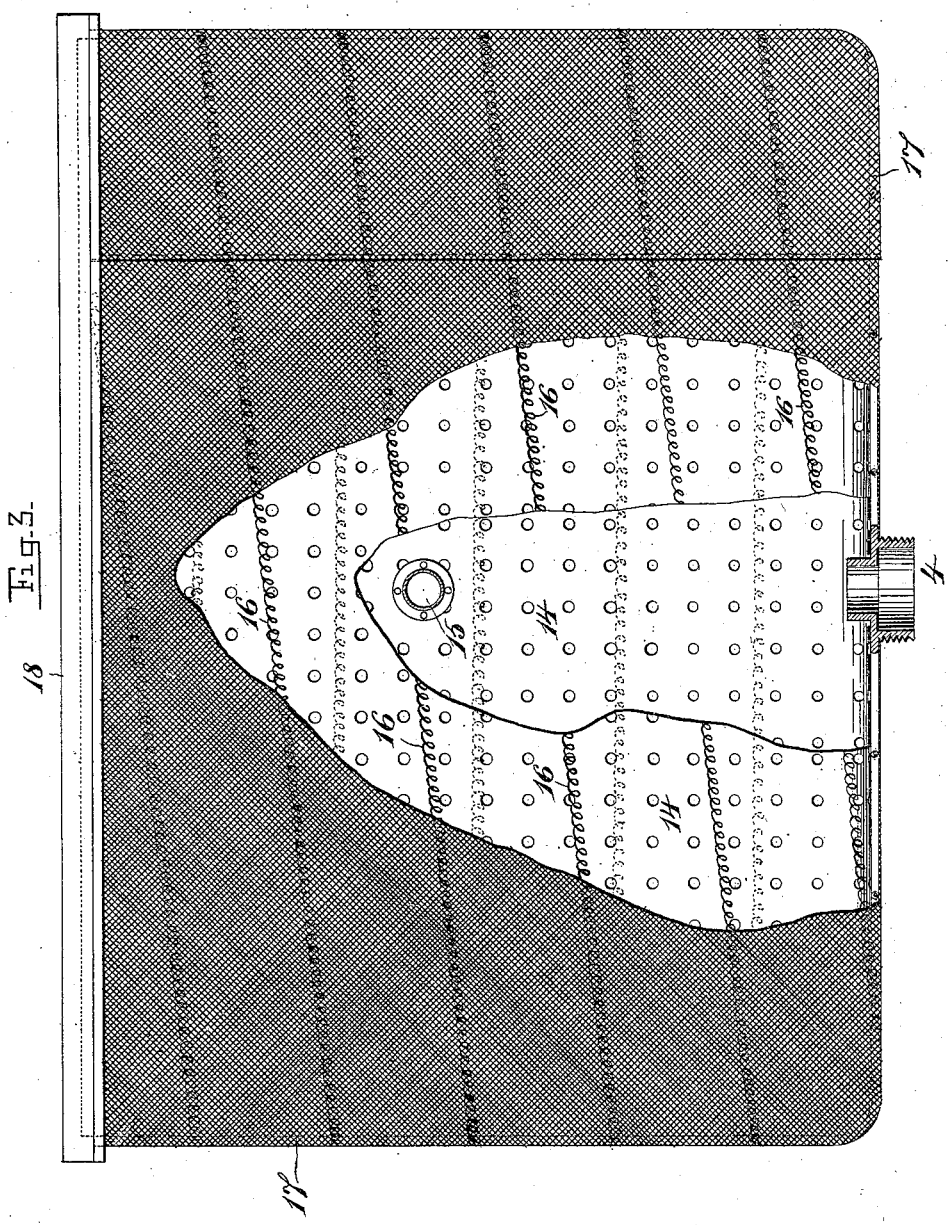
Witnesses:
Inventor:
David Rojat
by Henry Connett
Attorney

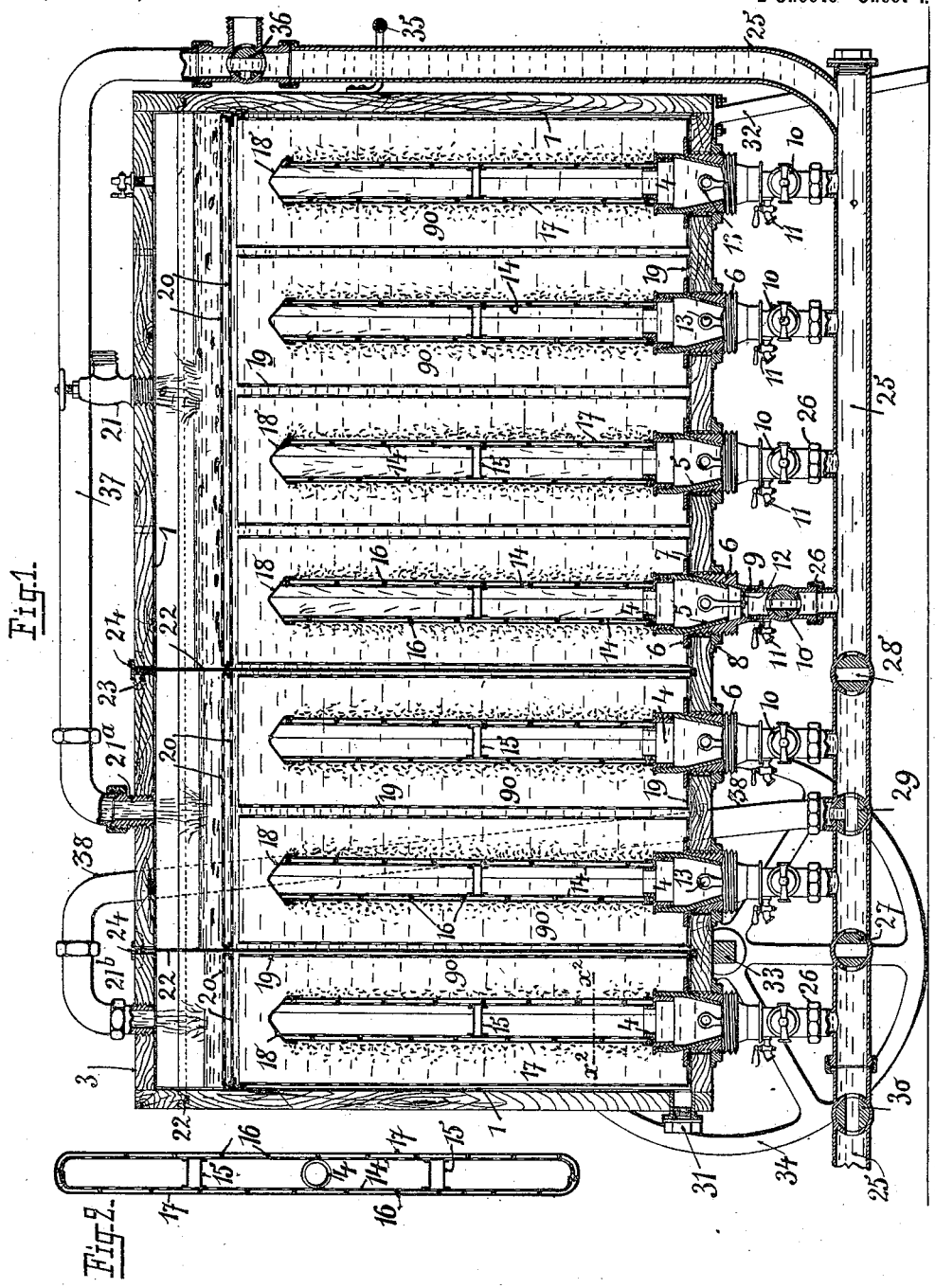

UNITED STATES PATENT OFFICE.

DAVID ROJAT, OF NIMES, FRANCE.

FILTERING APPARATUS.

SPECIFICATION forming part of Letters Patent No. 703,833, dated July 1, 1902.

Application filed July 24, 1901. Serial No. 69,542. (No model.)

*To all whom it may concern:*

Be it known that I, DAVID ROJAT, a citizen of the French Republic, residing at Nimes, Gard, France, have invented certain new and useful Improvements in Filtering Apparatuses, of which the following is a specification.

This invention relates to an apparatus for filtering wherein a plurality of filtering devices or elements are employed and adapted to be utilized singly or successively, as desired.

In the accompanying drawings, which illustrate the invention, Figure 1 is a vertical longitudinal section of the filtering apparatus, and Fig. 2 is a horizontal section at $x^2$ in Fig. 1 of one of the filtering elements. Fig. 3 is an enlarged side elevation of one of the filtering elements partly broken away to illustrate the construction.

In its general features the filtering apparatus consists of a rectangular box, preferably mounted on wheels, so as to be portable, and having a hermetically-closable cover. The chamber within this box is lined with sheet metal and is capable of division into compartments by sliding transverse vertical partitions. In the chamber and capable of separation, singly or in groups, by the sliding partitions are set a plurality of filtering elements—seven, as shown in Fig. 1. Pipes, cocks, and valves are provided, as will be more minutely described.

The inclosing box 2 has a cover 3, with a packing-ring 22, and both box and cover have a lining 1 of sheet metal of any suitable kind. The chamber or space within the box is capable of being divided into compartments by vertically-slidable partitions 22, which play in guide grooves or channels in the sides of the box. At one end the box may have supporting-legs 32 and a handle or handles 35, and at the other end supporting-wheels 34 on an axle 33.

The filtering elements in the chamber are or may be alike and one only need be minutely described. The chamber is divided into filtering-compartments by walls 19, of perforated metal, forming box-like chambers, and over these is a cover 20, formed of two spaced plates of perforated metal the holes in which should not register. In each of these box-like chambers is a filter element proper, which will now be described. Each filter element consists of a flat laterally-oblong upright chamber the walls of which are composed of perforated metal 14, an exterior spacing-grid of metal 16, an outer covering 17, of fine-wire gauze, and a coating 90 on said gauze of a paste of filtering material which serves as the filtering-body. Fig. 2 shows the shape or form of this device when seen in plan. At its bottom this filter element is open to the outlet 4 for the filtered liquid, and at its top it is roofed or covered with metal 18 to prevent the entry of liquid at the top. In Fig. 3, which shows the construction of the element, the spacing-grid is formed of coiled wires wrapped about the perforated metal. The fibrous outer coating or covering 90 is not shown in this view. It is simply a fibrous material wrapped or applied over the gauze 17. It will be noted that in Fig. 1 the partitions 22 separate the filtering devices or elements, a single one at the left and a group comprising the next two. The partitions 22 slide down through the cover 3 at slots 23, covered by displaceable strips 24. These partitions are inserted before the filter is put in operation and before the pipes 37 and 38 are in place.

The outlet 4 opens into a conical union 5, which fits into conical screw-nipple 6, set in the bottom of the box 2 and provided with packing 7 to prevent leakage at the joint. A nut 8 serves to draw the flange of the nipple 6 down firmly on the packing 7. In a short pipe 9, connecting the nipple 6 with a pipe 25, is the controlling-cock 10, and above this there may be a small drainage-cock 11. In the nipple 6 is a sieve or strainer 12, supported at 13. The pipe 9 is coupled to the common pipe 25 by a union 26, and the cock 10 serves to cut off communication between the filter element and the pipe 25. Cocks 27, 28, and 30 in the pipe 25 serve to cut off communication between the filter elements, and 29 is a two-way cock in the pipe 25, where it is coupled on a pipe 38, which extends up and enters the box 2 through the cover.

This type of filter with seven filtering elements is supposed to be operating in first filtration with four elements, in second filtration with two elements, and in third filtration with one element. The liquid to be filtered is admitted at the cock-controlled inlet 21 above the plates 20, flows through the latter and down through the spaces between the plates 19 and between the lining 1 and partition 22 and plates 19, passes into the filter element through the coating 90 and materials 17 and 14, and flows out through the outlets 4 and cocks 10 to the pipe 25. It then flows up through the upright portion (at the right in Fig. 1) of the pipe 25, through or by the open two-way cock 36, and thence through an upper pipe 37 to an inlet 21$^a$ to the second compartment of the filter containing two elements. From this compartment it flows to the pipe 25, between the closed cocks 27 and 28, and thence by the open two-way cock 29 to the pipe 38, which leads it to an inlet 21$^b$ into the single element compartment at the left in Fig. 1. From this compartment it passes again to the pipe 25 and by the open cock 30 to any point desired. The liquid may of course be made to pass, by a suitable arrangement of cocks, pipes, and partitions 22, through any desired number of elements for clarification. The coat of filtering material 90 may be of any suitably known kind and be of any suitable or desired thickness.

A mixture of pure cellulose and fibers of asbestos makes a good filtering material and is the one preferred. In this case the proportions of these two substances will vary by preference with the number of filtering elements employed in series. Where only two are used, a suitable proportion will be one hundred parts of cellulose to fifty parts of asbestos, and where four elements are used the proportions of the substances may be equal.

Near the bottom of the box 2 is a drainage-plug 31. There may be more than one of these.

In order to clean the filter, the cocks 10 are closed and the liquid drawn or drained off at 31. The cover 3 and plates 20 are removed and the elements in the chambers lifted out. This affords access for cleaning the elements and removing sediment and the like that may have collected. After washing and cleaning the parts are replaced as before.

Having thus described my invention, I claim—

1. In a filtering apparatus, the combination with the outer line casing or box and its cover, the slidable partitions 22 in said box for dividing the chamber therein into compartments, and the perforated plates 20, of a plurality of filtering elements mounted in said chambers and separated by said partitions, and pipes and cocks for conducting the liquid to be filtered from one compartment to another and controlling its flow, substantially as set forth.

2. In a filtering apparatus, the combination to form a filtering element, of the inner wall of perforated metal 14, forming a chamber, the spirally-disposed distancing-grid 16, about the outside of the metal 14, the gauze covering 17 over said grid, the fibrous filtering coating 90 of cellulose and asbestos, and the roof 18, said element having at its bottom an outlet for the filtered liquid, substantially as set forth.

In witness whereof I have hereunto signed my name, this 5th day of July, 1901, in the presence of two subscribing witnesses.

DAVID ROJAT.

Witnesses:
PAUL DUPONT.
JEAN MARIE PINGON.